(12) United States Patent
Kizu

(10) Patent No.: US 6,513,926 B1
(45) Date of Patent: Feb. 4, 2003

(54) DOUBLE-FOLDABLE EYEGLASSES

(75) Inventor: Asami Kizu, Fukui (JP)

(73) Assignee: Umeda Inc. (JP)

( * ) Notice: Subject to any disclaimer, the term of this patent is extended or adjusted under 35 U.S.C. 154(b) by 0 days.

(21) Appl. No.: 10/210,576

(22) Filed: Jul. 30, 2002

(51) Int. Cl.[7] ............................................. G02C 5/08
(52) U.S. Cl. ................... 351/63; 351/41; 2/454
(58) Field of Search ........................... 351/63, 41, 158; 2/454; 206/5

(56) References Cited

U.S. PATENT DOCUMENTS

| | | | | | |
|---|---|---|---|---|---|
| 4,820,035 A | * | 4/1989 | Kanda | ........................ | 351/63 |
| 5,231,429 A | * | 7/1993 | Kanda | ........................ | 351/63 |
| 5,640,218 A | * | 6/1997 | Kanda | ........................ | 351/63 |
| 5,751,393 A | * | 5/1998 | Yamazaki | .................... | 351/63 |
| 6,315,408 B1 | * | 11/2001 | Huang | ........................ | 351/63 |

* cited by examiner

*Primary Examiner*—Hung X. Dang
(74) *Attorney, Agent, or Firm*—Ostrolenk, Faber, Gerb & Soffen, LLP

(57) ABSTRACT

Disclosed is a double foldable eyeglasses whose opposite temples can be folded toward the front, and then turned downward, thereby laying the folded temples below the front to be coplanar therewith. The front of the eyeglasses has two traverses integrally connected to the opposite ends of the bridge and to the opposite perpendicular joint pieces, and the opposite temples are hinged to the perpendicular joint pieces. The bridge comprises a hollow tube, and two opposite axles each integrally connected to one or the other rim are fitted in the hollow tube. Each axle has a coiled spring wound therearound, one end of the coiled spring being fixed to the axle, and the other end being fixed to the bridge. Each axle has a retainer formed thereon to be caught by catch means formed in the hollow tube. A resilient force to be applied to the rim increases with the increase of the angular rotation of the rim through the agency of coiled springs. With this arrangement the eyeglasses can be double-folded with its temples folded and laid below the front while being spring-biased toward the stress-free position, in which the eyeglasses are unfolded.

2 Claims, 5 Drawing Sheets

DOUBLE-FOLDABLE EYEGLASSES

BACKGROUND OF THE INVENTION

1. Field of the Invention

The present invention relates to a pair of double-foldable eyeglasses whose opposite temples can be folded both about their hinges and about the rim-to-rim bridge of the front of the eyeglasses toward a compact configuration adaptable to be contained in an eyeglasses casing.

2. Related Arts

A conventional pair of eyeglasses is put in a casing with its temples folded on its front. The opposite temples are hinged to the opposite joint pieces, which are soldered to the opposite sides of the front. After removing the eyeglasses from the face, the opposite temples are folded on the front by rotating about their hinges, so that the opposite temples may be laid on the front. The so folded eyeglasses is relatively thick because the temples are laid additionally on the front, and accordingly the casing is thick.

In an attempt to permit a pair of eyeglasses to be folded in a more compact configuration, a certain pair of eyeglasses is so designed that its opposite temples may be folded toward or above the front, and that the so folded temples may be turned to the lower side of the front, thus lying in the front-coplanar plane, in which the front and the folded temples are laid. FIG. 5 shows how such a double-foldable type of eyeglasses is folded to be put in its casing. As shown, lateral "L"-shaped extensions "b" are soldered to the opposite sides of the front "a" of the eyeglasses, and first joints "c" are connected to the lateral extensions "b". Perpendicular extensions from the first joints "c" are rotatably connected to the opposite temples "e" via second joints "d".

Specifically each "L"-shaped lateral extension "b" has a split end to sandwich the projection of the end of each perpendicular extension, which is rotatably fixed to the lateral extension "b" by inserting pins through the holes made in the sprit end and the projection. Thus, the perpendicular extensions can be rotated about the ends of the "L"-shaped lateral extensions "b" along with the opposite temples "e". The perpendicular extensions are long enough to cover the vertical side of each rim. As shown in FIG. 5, the pair of eyeglasses is double-folded by folding the opposite temples "e" on the front "a", and by turning and laying the so folded temples "e" below the front. Thus, the front "a" and the opposite temples "e" are laid in one and same plane. The folded configuration is much thinner than an ordinary pair of glasses whose opposite temples are folded and laid on the front. As may be perceived, the ordinary pair of glasses has no first joint-and-perpendicular extension to permit the double folding of the eyeglasses.

Disadvantageously when wearing the double-foldable eyeglasses on the face, the first joint-and-perpendicular extensions are apt to move under the influence of the weight of the front when the face moves, resulting that the front "a" is inclined relative to the face, and that the pair of eyeglasses is displaced almost apart from the face. Still disadvantageously, such double-foldable eyeglasses gives a less pleasing fitness to the wearer.

SUMMARY OF THE INVENTION

One object of the present invention is to provide a double-foldable eyeglasses assuring that it gives stable, pleasing fitness to the wearer.

To attain this object a pair of foldable eyeglasses whose opposite temples can be folded both about their hinges and about the rim-to-rim bridge of the front of the eyeglasses toward a compact configuration adaptable to be contained in an eyeglasses casing, is improved according to the present invention in that the front of the eyeglasses has two traverses integrally connected both to the opposite ends of the bridge and to the opposite perpendicular joint pieces, extending along the upper sides of the opposite rims, the opposite temples being foldably connected to the opposite perpendicular joint pieces, and that the bridge comprises a hollow tube, two opposite axles each integrally connected to one or the other rim and rotatably fitted in the hollow tube, and two coiled springs each wound around one or the other axle, one end of the coiled spring being fixed to the axle, and the other end of the coiled spring being fixed to the bridge, each axle having a retainer formed thereon to be caught by catch means formed on one or the other end of the hollow tube to prevent further rotation of the axle relative to the hollow tube, and the hollow tube and the opposite axles being provided with means to prevent the opposite axles from slipping off from the hollow tube.

The hollow tube has notches made on its opposite open ends, and two slots made a predetermined distance apart from each end, whereas each axle has a groove made close to its end, the retainer projecting from a selected place close to the axle-to-rim joint, whereby the opposite axles are rotatably fastened to the hollow tube by allowing two resilient rings to snap in the slots of the hollow tube and in the grooves of the abutting axles with their retainers caught by the notches of the hollow tube.

Other objects and advantages of the present invention will be understood from the following description of a pair of double-foldable eyeglasses according to one preferred embodiment of the present invention, which is shown in accompanying drawings.

DETAILED DESCRIPTION OF PREFERRED EMBODIMENT

Figure 1:
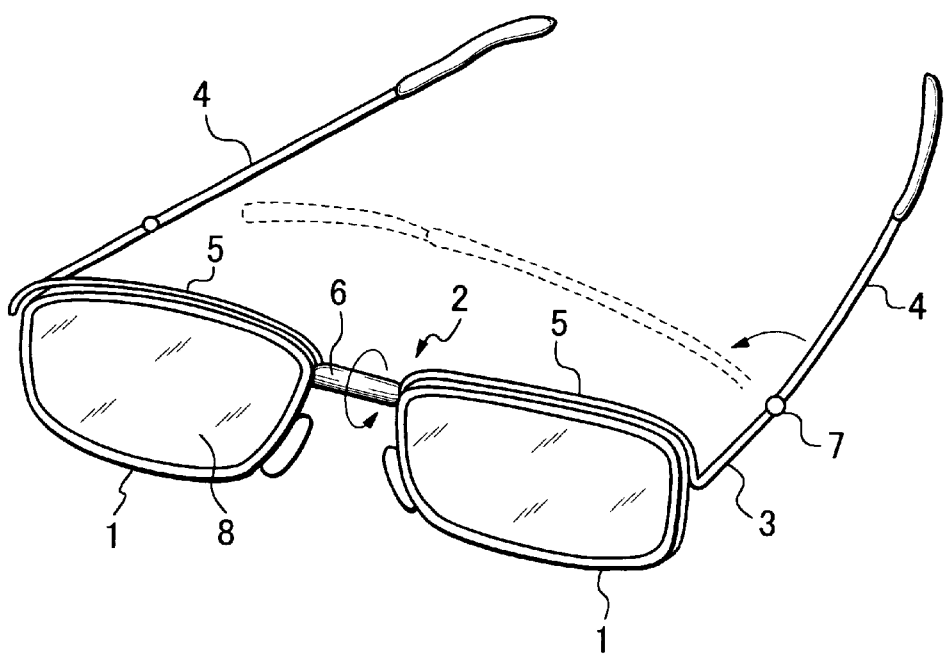
FIG. 1 is a perspective view of a pair of double-foldable eyeglasses according to one embodiment of the present invention.

Referring to FIG. 1, a pair of double-foldable eyeglasses according to the present invention has its opposite temples 4 foldable both about their hinges 7 and about the rim-to-rim bridge 6 of the front of the eyeglasses toward a compact configuration, as described later in detail. Such a compact configuration is most adaptable to be contained in an eyeglasses casing.

The front of the eyeglasses has two traverses 5 and 5 integrally connected both to the opposite ends of the bridge 6 and to the opposite perpendicular joint pieces 3. The traverses 5 and 5 extend along the upper sides of the opposite rims 1. Each traverse-and-perpendicular joint piece may be formed as a whole, or otherwise as separate parts, which may be soldered later. The opposite temples 4 are foldably connected to the perpendicular joint pieces 3 via the hinges 7.

In the drawing each rim 1 is shown as a closed loop, but it may be composed of an upper half-rim and a high-tension string fastened to the opposite ends of the upper half-rim to hold the lens 8. Incidentally each rim 1 is rotatably connected to the bridge 6 with its axle 9 fitted in the bridge 6, as described below.

Figure 2:
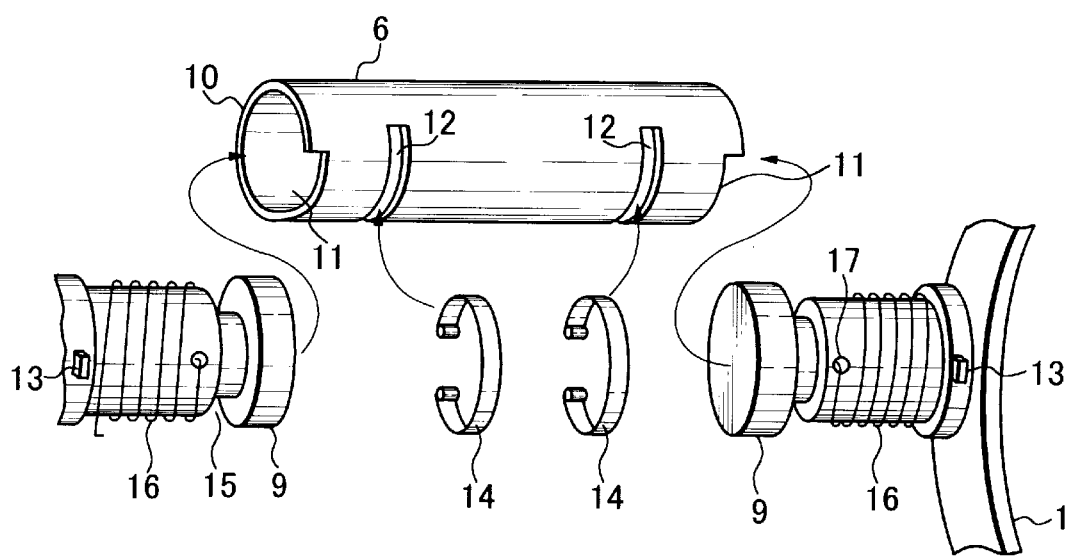
FIG. 2 is an exploded view of the bridge of the front of the double-foldable eyeglasses.

Referring to FIG. 2, the bridge 6 is a hollow tube having a hollow space 10 to accommodate the axle 9 projecting from each rim 1. The two opposite axles 9 each integrally connected to, and projecting from the rim 1 are rotatably fitted in the hollow tube 6. The hollow tube 6 has notches 11 made on its opposite open ends, and two slots 12 are made a predetermined distance apart from each end of the hollow tube 6. Each axle 9 has a circumferential groove 15 made close to its end, and a retainer 13 projects from a selected place close to the axle-to-rim joint. In addition, the axle 9 has a diameter-reduced section formed behind the groove 15, and a coiled spring 16 is wound around the diameter-reduced section to be coplanar with the outer circumference of the axle 9, thereby preventing the coiled spring 16 from being caught by the hollow tube end, still permitting the axle 9 to closely fit in the hollow space 10 of the bridge 6. One end of the coiled spring 16 is fixed to a hole 17 made on the axle 9, and the other end of the coiled spring 16 is fixed to the bridge 6. Assuming that a push is given to each rim 1 to incline while making its axle 9 turn in one direction, the coiled spring 9 is twisted to produce the repulsive force, which makes the axle 9 turn in the opposite direction when the push is removed.

Figure 4A:
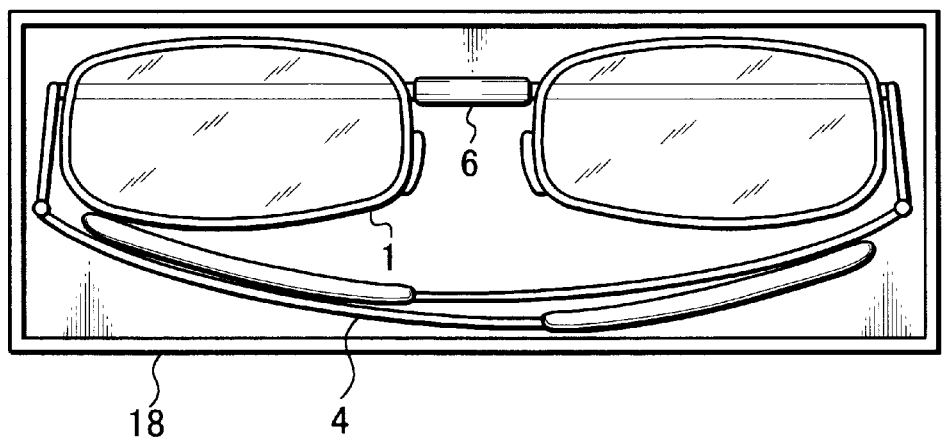
FIGS. 4a and 4b illustrate how the double-foldable eyeglasses is folded and put in a casing.
Figure 4B:
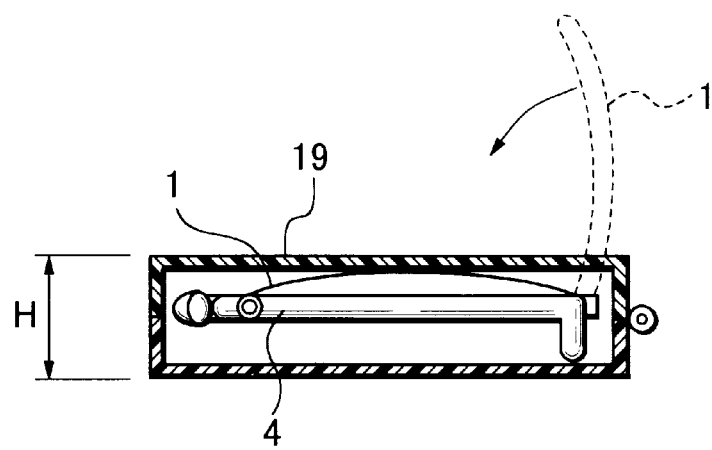
Figure 5:
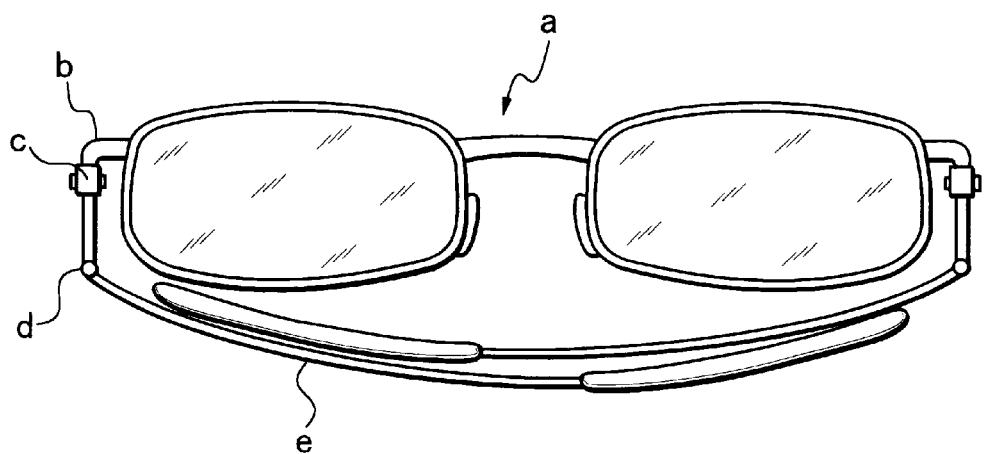
FIG. 5 shows how a conventional double-foldable pair of eyeglasses is folded.

The opposite axles 9 are rotatably fitted in the hollow tube 6, and fastened thereto by allowing two resilient rings 14 to snap in the slots 12 of the hollow tube 6 and in the grooves 15 of the abutting axles 9 while their retainers 13 are caught by the notches 11 of the hollow tube 6. Then, the traverse-and-perpendicular joint piece combinations and the rim-and-lens combinations are put in their stress-free, initial position in which the eyeglasses can be worn on the face with the opposite temples unfolded as shown in FIG. 1. The eyeglasses can be double-folded toward its compact configuration by folding the opposite temples 4 above the front and by pushing the opposite lenses 8 against the counter resilient force exerted by the coiled springs 16, thereby making the opposite lenses 8 yieldingly incline about the bridge 6 to be coplanar with the perpendicular joint pieces 3. Thus, the folded temples 4 are laid below the front, and then the eyeglasses can be put in the casing as shown in FIG. 4. When releasing the double-folded eyeglasses from the hand or when being taken out of the casing, the front of the eyeglasses springs back from the compact configuration to the stress-free, initial position, as shown in FIG. 1.

Figure 3:
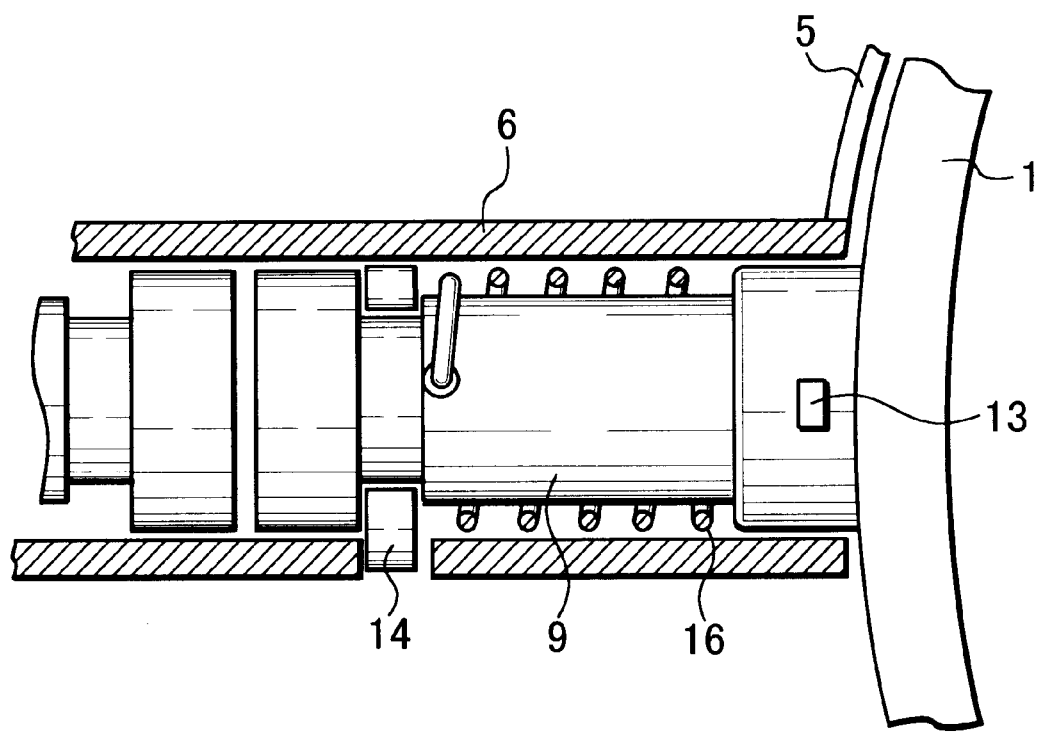
FIG. 3 is a sectional view of the bridge-to-rim joint, showing how the axle is fitted in the hollow tube.

The rim-and-lens combinations 1 and 8 and the bridge-and-traverse combinations 6 and 5 are held stable under the influence of the coiled springs 16, and the eyeglasses can be worn on the face in such a stable way that little or no displacement of the eyeglasses is caused on the face when the face moves. FIG. 3 shows, in section, how the axle 9 is fitted in the hollow tube 6. In this particular embodiment each rim 1 has its axle 9 fastened thereto, and the axle 9 is fitted in the hollow tube 6. As an alternative of such cantilever configuration a single axle may be fitted in the hollow tube 6 with it's opposite ends fastened to the opposite rims 1 by soldering to or threadedly engaging therewith. In the latter case the male and female threads are formed on the axle and the rim, and the so formed male and female threads are directed so as to be tightened in tilting the rims 1.

In such an alternative case the single axle has two coiled springs wound in the same way as shown in FIG. 2 to be twisted increasingly with the increasing of the angular rotation of the single axle. Referring to FIGS. 4(*a*) and 4(*b*), the double-foldable eyeglasses is put in the casing. As shown, the opposite temples 4 are laid below the front, and therefore, the double-folded configuration is thin, compared with the folded configuration of the conventional eyeglasses with its opposite temples laid on the front. Accordingly the casing 18 can be reduced substantially in thickness.

When it is desired that the eyeglasses is contained in the casing, first, the eyeglasses is put in the open casing 18 with its opposite temples 4 folded toward the front, allowing the rims 1 to rise upright, as seen from FIG. 4(*b*) in broken line. When the lid 19 of the casing 18 is closed, the rims 1 are yieldingly tilted to be put in the closed casing 18. When the lid 19 is opened, the rims 1 spring back to rise upright under the influence of the coiled springs 16.

The double-foldable eyeglasses according to the present invention provides the following advantages:

- the double-folded configuration is small, compact and most adaptable to be contained in a relatively small casing, the thickness of which casing is as thin as the front of the eyeglasses; the opposite temples are folded and laid below rather than behind the front;
- the use of coiled springs allows the double-folded configuration to return to its stress-free, original shape automatically when it is taken out of the casing; and
- the coiled springs has the effect of keeping the rims stable in position, preventing the rims from tilting or displacing from the face when the face moves.

What is claimed is:

1. A pair of foldable eyeglasses whose opposite temples can be folded both about their hinges and about the rim-to-rim bridge of the front of the eyeglasses toward a compact configuration adaptable to be contained in an eyeglasses casing, characterized in that the front of the eyeglasses has two traverses integrally connected both to the opposite ends of the bridge and to the opposite perpendicular joint pieces, extending along the upper sides of the opposite rims, the opposite temples being foldably connected to the opposite perpendicular joint pieces, and that the bridge comprises a hollow tube, two opposite axles each integrally connected to one or the other rim and rotatably fitted in the hollow tube, and two coiled springs each wound around one or the other axle, one end of the coiled spring being fixed to the axle, and the other end of the coiled spring being fixed to the bridge, each axle having a retainer formed thereon to be caught by catch means formed on one or the other end of the hollow tube to prevent further rotation of the axle relative to the hollow tube, and the hollow tube and the opposite axles being provided with means to prevent the opposite axles from slipping off from the hollow tube.

2. A pair of foldable eyeglasses according to claim 1, wherein the hollow tube has notches made on its opposite open ends, and two slots made a predetermined distance apart from each end, whereas each axle has a groove made close to its end, the retainer projecting from a selected place close to the axle-to-rim joint, whereby the opposite axles are rotatably fastened to the hollow tube by allowing two resilient rings to snap in the slots of the hollow tube and in the grooves of the abutting axles with their retainers caught by the notches of the hollow tube.

* * * * *